United States Patent [19]

Nowakowski

[11] Patent Number: 4,959,004
[45] Date of Patent: Sep. 25, 1990

[54] PAD-FORMING DEVICE WITH HOLD-DOWN KNOCKOUT PIN

[75] Inventor: Stanley M. Nowakowski, Cranford, N.J.

[73] Assignee: Sure-Cast Pattern Works, Inc., Cranford, N.J.

[21] Appl. No.: 278,042

[22] Filed: Nov. 30, 1988

[51] Int. Cl.⁵ .............................................. B29C 51/30
[52] U.S. Cl. .................................... 425/397; 264/321; 425/399; 425/400; 425/444; 249/68
[58] Field of Search ............... 425/394, 396, 397, 398, 425/399, 400, 403.1, 444; 264/321, 324; 249/67, 68

[56] References Cited

U.S. PATENT DOCUMENTS

| | | | |
|---|---|---|---|
| 208,097 | 9/1878 | House | 264/324 |
| 2,004,530 | 6/1935 | Howe et al. | 425/400 |
| 2,179,692 | 11/1939 | Fuchs | 425/399 |
| 2,809,394 | 10/1957 | Harvey | 425/422 |
| 2,860,374 | 11/1958 | Harrison et al. | 425/422 |
| 2,899,705 | 8/1959 | Darlington, Jr. | 264/318 |
| 3,192,569 | 7/1965 | Knabel | 425/586 |
| 3,597,800 | 8/1971 | Silverman | 425/400 |
| 3,614,810 | 10/1971 | Schmier | 425/411 |
| 3,660,002 | 5/1972 | Morroni | 425/405.1 |
| 3,718,415 | 2/1973 | De Felice | 425/444 |
| 3,799,727 | 3/1974 | Howard | 425/397 |
| 4,064,208 | 12/1977 | Hanning | 264/39 |
| 4,162,885 | 7/1979 | Asel | 425/400 |
| 4,360,491 | 11/1982 | Holden, Jr. | 425/400 |
| 4,469,655 | 9/1984 | Kiss | 264/82 |
| 4,470,786 | 9/1984 | Sano et al. | 425/125 |
| 4,686,076 | 8/1987 | Dromigny et al. | 264/275 |

*Primary Examiner*—James C. Housel
*Attorney, Agent, or Firm*—Lerner, David, Littenberg, Krumholz & Mentlik

[57] ABSTRACT

An apparatus for the safe and efficient shaping of a heat-formable resilient material includes an upright male shaping member, a female molding member having a cavity adapted to matingly receive the upright male shaping member, a retractable hold-down knockout pin extending through the female molding cavity to a predetermined distance from the upright male shaping member when the pad-forming device is in the open position so that the resilient material can be inserted between the hold-down knockout pin and the upright male shaping member. The hold-down knockout pin moves away from the upright male shaping member to a retracted position when the pad-forming device is closed and advances towards the male shaping member to eject any shaped pads which might adhere to the female molding cavity while returning to the advanced position at a predetermined distance from the upright male shaping member.

16 Claims, 8 Drawing Sheets

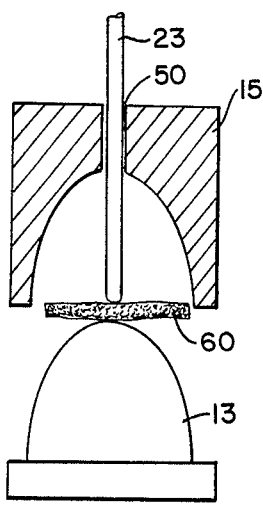
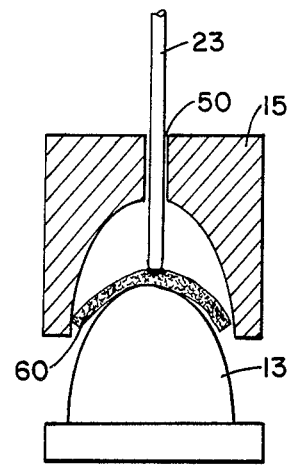
FIG. 9A  FIG. 9B
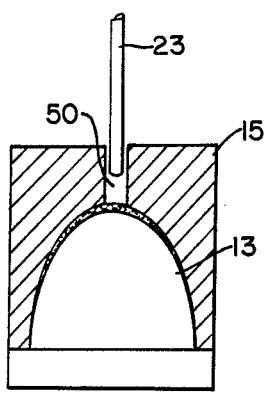
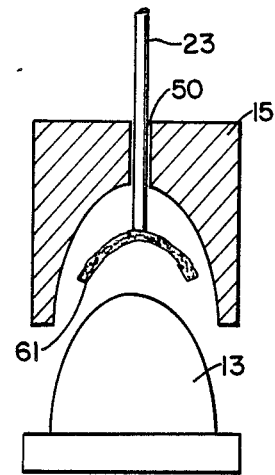
FIG. 9C  FIG. 9D

PAD-FORMING DEVICE WITH HOLD-DOWN KNOCKOUT PIN

BACKGROUND OF THE INVENTION

The present invention relates generally to molding devices, and more particularly to devices for shaping heat-formable resilient materials.

In the garment industry, designers of women's apparel often employ "shoulder pads" in dresses, blouses and other tops to give a woman the appearance of somewhat broader, more defined shoulders. Such shoulder pads are normally made of a resilient material such as a fibrous polyester which is heat-molded to have a predetermined radius of curvature that conforms snugly about the shoulder of a woman. The pads are either sewn to the inside of a garment or include fasteners, such as VELCRO (a trademark), to removably fasten the pad to the interior of a garment. The devices for forming such shoulder pads normally include an upright male shaping member situated beneath a female molding member which has a cavity adapted to receive the male shaping member when the female molding member descends to a closed position. The male shaping member and the female molding member are heatable so as to cooperatively shape a piece of heat-formable material which is placed on the male shaping member when the male shaping member and the female molding member are in an open position.

During the production of such shoulder pads, the operator of a pad-forming device places the material to be molded on the top of the male shaping member when the device is in the open position. Because of the small radius of curvature on the male shaping member, the material to be shaped often falls off the male shaping member prior to the closing of the female molding member onto the male shaping member. Thus, operators are tempted, and often do, hold the material to be shaped on the male shaping member until the female molding member begins to descend. This is extremely dangerous as the operator's hands could be crushed between the male shaping member and the female molding member if the operator does not quickly remove his or her hands as the female molding member reaches the male shaping member.

In an effort to increase productivity, some such pad-forming devices include a pair of female molding members and male shaping members so that an operator can insert for shaping in the device two pieces of material, one with each hand. These dual pad-forming devices necessarily occupy both hands of an operator, who must hold the two pieces of material in position for shaping prior to the closing of the male and female members. Thus, if the dual pad-forming device is not automated for the closing of the male shaping member and the female molding member, which automation could be extremely dangerous under these circumstances, the operator must actuate the closing of the male shaping member and the female molding member with a foot pedal or hip. Further, operators will become cognizant of this danger and would hopefully become extremely cautious in carrying out the steps of operating the pad-forming device. Such cautiousness, however, will affect the speed and efficacy with which the operator can carry out his or her responsibilities, thus decreasing productivity.

Another problem associated with pad-forming devices of the type described above is that of the heat-formable material sticking to the cavity surface of the heated female molding member after shaping. When this occurs, the operator must somehow remove the stuck material before continuing the operation of the pad-forming device. Again, this is not only dangerous because the female molding member is heated, but this also decreases productivity because it is time consuming.

To date, no suitable alternative to the above-described method of operation has been put to practice. Molding devices for materials other than those which are resilient have provided elements for holding a workpiece in place prior to the closing of the mold. For example, U.S. Pat. No. 4,686,076 to Dromigny et al discloses a method and apparatus for fabricating, by injection molding, containers having a film coating on their exterior. Dromigny et al provides a male element and a mateable female element disposed in side by side relation, the male element being movable into a cavity of the female element during operation. A horizontal slider is retractably disposed within the female element to hold the film against the male element prior to the closing of the mold. Once the mold is closed, a synthetic material is injected through an injection nozzle provided in the central region of the male element. After the synthetic material sets to form a film-coated container, the male element retracts from the female element to open the mold while the slider advances to eject the film coated container. It is particularly noted that the slider provided in Dromigny et al forcibly holds the film directly against the male element in a vertical position. Further, the Dromigny et al device is constructed so that the film must be maintained in position adjacent to the male element until the slider advances to hold the film against the male element. In this manner, the elements of the Dromigny et al device are not pre-positioned and, therefore, must move in order to get in position to hold the work-piece for molding. Thus, the Dromigny et al device does not solve the above-described problem because an operator's hands would still be in the work area while elements of the device were moving to hold the material.

The above shortcomings make it apparent that improvements which facilitate the safe and efficient operation of pad-forming devices are warranted. Such improvements would be applicable not only to the formation of shoulder pads for women's garments but also to the molding and shaping of other articles made from heat-formable resilient materials. Thus, although the present invention will find its purposes to be furthered primarily with respect to pad-forming devices for molding and shaping shoulder pads for women's garments, it is directed at molding and shaping processes and devices in general.

SUMMARY OF THE INVENTION

The present invention specifically relates to an apparatus for the safe and efficient shaping of heat-formable resilient materials and includes a heatable male shaping member having a top and sides of predetermined curvature, a heatable female molding member having a cavity adapted to matingly receive the top and sides of the male shaping member when the male shaping member and female molding member are in a closed position, and a retractable hold-down element which is positioned at a predetermined distance from the male shaping member while the male shaping member and female molding member are in an open position so that a piece of resilient material can be worked between the hold-down element and the male shaping member. Preferably, the retractable hold-down element moves to a retracted position when the male shaping member and female molding member are in a closed position so that the retractable hold-down element does not interfere with the shaping of the resilient material. Upon the opening of the male shaping member and the female molding member after shaping the resilient material, the hold-down element again advances to a position at a predetermined distance from the male shaping member. In the beginning stages of such advancement, the hold-down element ejects any shaped pads which might have become adhered to the heated female molding member.

Accordingly, it is an object of the present invention to provide a pad-forming device which obviates the need for an operator to manually hold the material to be shaped between the molding and shaping members immediately prior to the closing of the mold, thus providing a safe working environment.

It is another object of the present invention to provide a pad-forming device which provides for the ejection of any material which might adhere to the heated molding or shaping members, thus increasing the efficiency and productivity in shaping pads.

BRIEF DESCRIPTION OF THE DRAWINGS

The above and other objects of the present invention will become apparent, as will a better understanding of the concepts underlying the present invention, by reference to the description which follows when taken in conjunction with the accompanying drawings in which:

FIG. 9A is an enlarged partial cross-section of a female molding member and male shaping member of a pad-forming device in accordance with the present invention shown in the open position, illustrating in particular a piece of resilient material being held between the hold-down knockout pin, in its advanced position, and the male shaping member;

FIG. 9B is an enlarged partial cross-section of the female molding member and male shaping member shown in FIG. 9A as the female molding member begins to descend upon the male shaping member;

FIG. 9C is an enlarged partial cross-section of the female molding member and the male shaping member in a closed position as the piece of resilient material is being shaped, illustrating in particular the retracted position of the hold-down knockout pin; and FIG. 9D is an enlarged partial cross-section of the female molding member and the male shaping member as the female molding member begins to ascend to the open position, illustrating in particular the ejectment position of the hold-down knockout pin.

DETAILED DESCRIPTION

Figure 1:
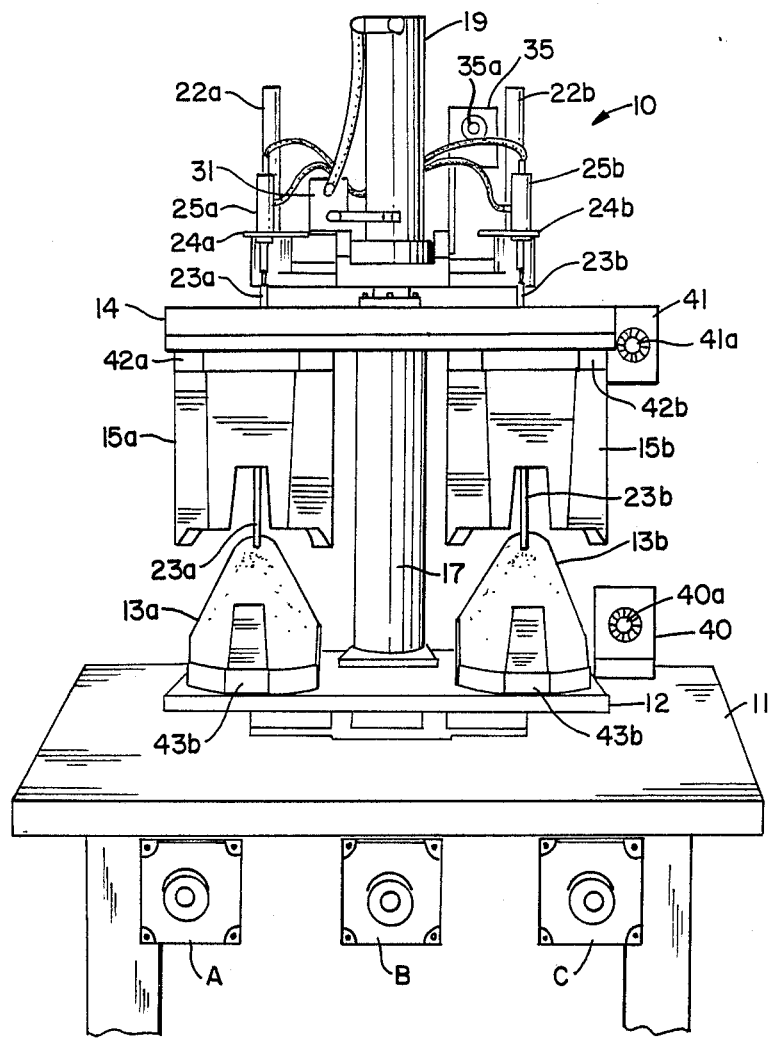
FIG. 1 is a front perspective view of a pad-forming device in accordance with the present invention shown with the shaping members in the open position.

Referring to the drawings, FIGS. 1-9 show a preferred embodiment of the pad-forming device generally designated as 10 in accordance with the present invention.

Figure 2:
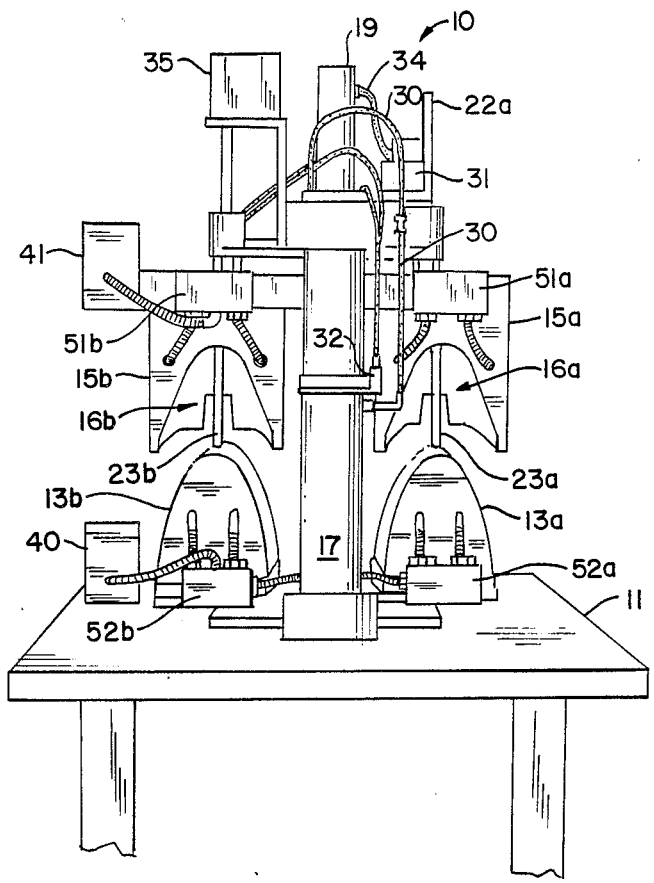
FIG. 2 is a rear perspective view of the pad-forming device shown in FIG. 1.

The pad-forming device 10 is supported on table 11 and includes a stationary lower platform 12 on which heatable male shaping members 13a and 13b are disposed in an upright position. A movable upper platform 14 having heatable female molding members 15a and 15b connected to the lower surface thereof is provided directly above lower platform 12 and male shaping members 13a and 13b. The female molding members 15a and 15b include molding cavities 16a and 16b, respectively, as shown in FIG. 2. The molding cavities 16a and 16b have predetermined curvatures for matingly receiving the respective male shaping members 13a and 13b when shaping pieces of resilient material, as will be described hereinafter.

As shown in FIGS. 1-4, a vertical support member 17 is provided at the rear of the pad-forming device 10 for holding cantilevered member 18 in a position above upper platform 14. A cylinder 19 is fastened to the upper surface of cantilever member 18 and includes a piston rod 20 which is disposed for slidable movement in and out of the cylinder 19 for effecting the descending and ascending movement of the upper platform 14 to which the piston rod 20 is secured. The cantilevered member 18 also provides bushings 21a and 21b through which guide pins 22a and 22b, respectively, are slidably disposed. The guide pins 22a and 22b are connected to the upper surface of upper platform 14 and extend upwardly through the bushings 21a and 21b for guiding the female molding members 15a and 15b during its up and down movement. The particulars regarding the actuation of the up and down movement of the female molding members 15a and 15b will be discussed in detail below.

Figure 3:
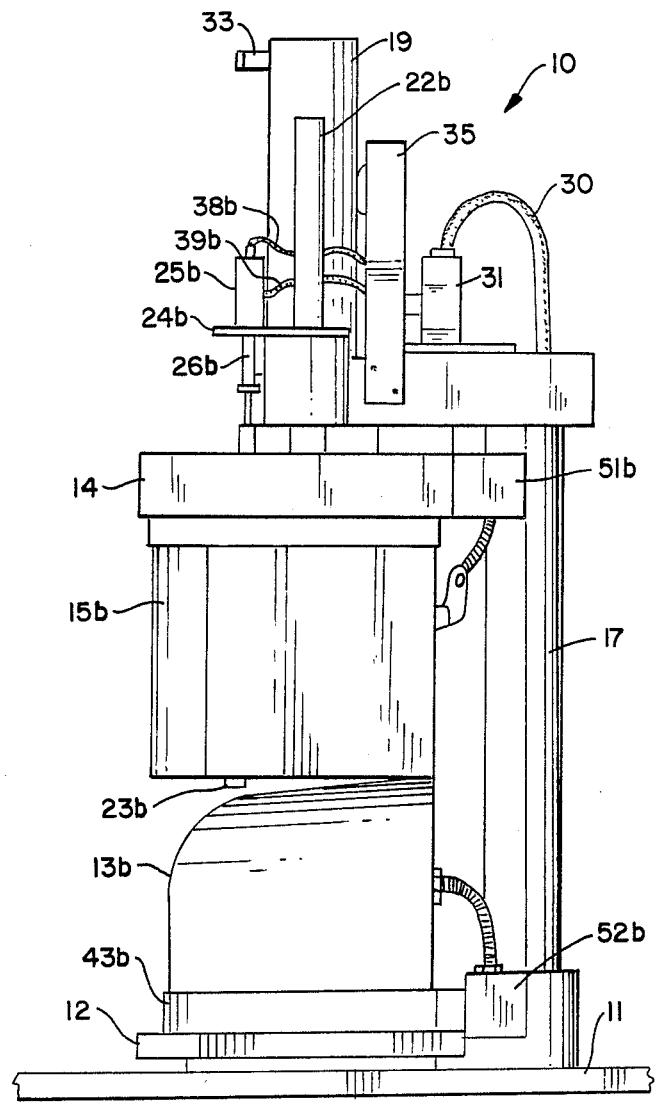
FIG. 3 is a left side elevational view of the pad-forming device shown in FIG. 1.

The pad-forming device 10 further includes two hold-down knockout pins 23a and 23b for holding two pieces of resilient material prior to the closing of the shaping members 13 and molding members 15. The retractable hold-down knockout pins 23a and 23b extend downwardly from the plates 24a and 24b which are secured to the bushings 21a and 21b, through openings 50 (FIGS. 9A-9D) of the respective female molding members 15a and 15b and into the respective molding cavities 16a and 16b where the end of the hold-down knockout pins 23a and 23b are situated at a predetermined distance from the respective male shaping members 13a and 13b as shown in FIG. 3. The movement of the hold-down knockout pins 23a and 23b is effected by means of mini-cylinders 25a and 25b which include mini-pistons (not shown) and mini-piston rods 26a and 26b to which the hold-down knockout pins 23a and 23b are connected. This piston and cylinder assembly is pneumatically driven, as will be explained below.

Figure 4:
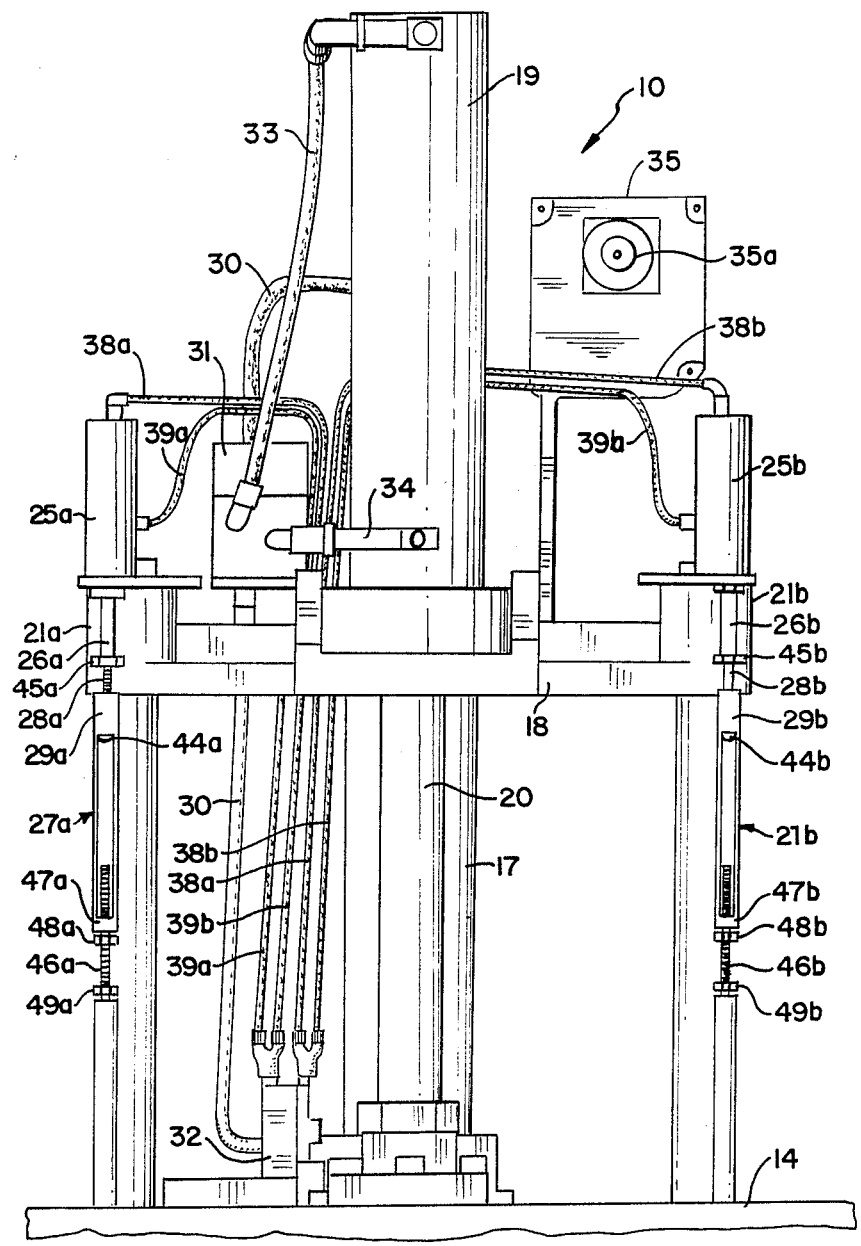
FIG. 4 is an enlarged front view of the cylinders, pistons and retractable pins above the female and male members of the pad-forming device shown in FIG. 1, illustrating in particular the structure of the retractable pins.
Figure 5:
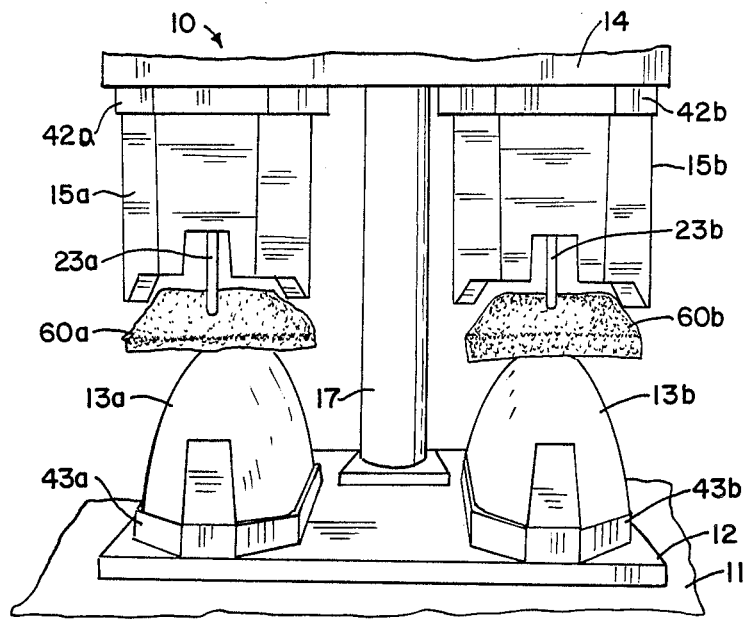
FIG. 5 is an enlarged front elevational view of the shaping and molding members of the pad-forming device shown in FIG. 1 with a relatively thin sheet of resilient material between the left retractable pin and left male shaping member and a relatively thick sheet of resilient material between the right retractable pin and right male shaping member, thus illustrating the manner in which the "play" in the retractable pins accommodates materials of different thicknesses.
Figure 6:
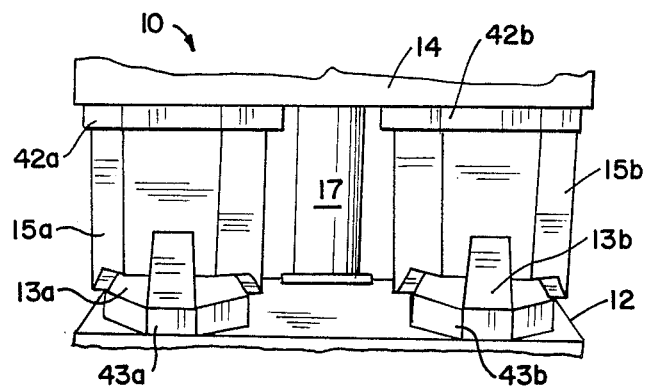
FIG. 6 is a front elevational view of the shaping and molding members of the pad-forming device shown in FIG. 1 with the shaping members in the closed position to shape the two pieces of material shown in FIG. 5 into pads.

The hold-down knockout pins 23a and 23b include turnbuckle couplings 27a and 27b connected to the mini-piston rods 26a and 26b of the piston and cylinder assembly. The turnbuckle couplings 27a and 27b are provided so that the length of hold-down knockout pins 23a and 23b are adjustable, whereby the distance between the end of the hold-down knockout pins 23a and 23b and the male shaping members 13a and 13b can be adjusted to accommodate resilient materials of different sizes, as shown in FIG. 5. Such adjustment is accomplished by threadedly adjusting threaded members 46a and 46b, shown in FIG. 4, of the hold-down knockout pins 23a and 23b in threaded portions 47a and 47b of the turnbuckle couplings 27a and 27b or in the threaded ends of the hold-down knockout pins 23a and 23b. Nuts 48a and 48b and nuts 49a and 49b are provided to secure the threaded members 46a and 46b in the threaded position chosen, thus securing the hold-down knockout pins 23a and 23b at the chosen predetermined distance from the male shaping members 13a and 13b.

To further accommodate resilient materials of different sizes without having to manually adjust the turnbuckle couplings 27a and 27b, the hold-down knockout pins 23a and 23b possess a predetermined degree of vertical "play." That is, the hold-down knockout pins 23a and 23b are permitted to move freely in the upward vertical direction when piece of resilient material is "worked" between the end of the hold-down pin and the male shaping member. This free movement is permitted without the need for actuating the pneumatics which operate the piston and cylinder assembly. This can be accomplished in several ways, but in the described embodiment, rod extension members 28a and 28b are provided for slideable connection through sleeve portions 29a and 29b of turnbuckle couplings 27a and 27b. The rod extension members 28a and 28b are threaded for threaded connection with female threads (not shown) of the piston rods 26a and 26b. Prior to such threaded connection, the rod extension members 28a and 28b are inserted through the sleeve portions 29a and 29b. Thus, the turnbuckle couplings 27a and 27b are disposed to hang freely on rod extension heads 44a and 44b at the end of the rod extension members 28a and 28b, and can freely slide up the rod extension members 28a and 28b when the hold-down knockout pins 23a and 23b are moved in the upward direction by the insertion of material between the same and the male shaping members 13a and 13b. The degree of such upward movement can be limited by adjustable limit nuts 45a and 45b so that the hold-down knockout pins 23a and 23b can accommodate a larger range of resilient materials. In FIG. 4, it can be seen that the amount of upward vertical movement permitted is equal to the exposed length of the rod extension members 28a and 28b. Of course, the sleeve portions 29a and 29b of the turnbuckle couplings 27a and 27b will abut the limit nuts 45a and 45b to prevent further upward vertical movement of the hold-down knockout pins 23a and 23b.

Thus, as shown in FIG. 5, the resiliency of the materials to be shaped and the free vertical "play" provided in the structure of the hold-down knock-out pins 23a and 23b provides a construction adapted to receive resilient material having different thicknesses. It is apparent that the resilient material 60a is relatively thin as compared to the relatively thick resilient material 60b. This is a particularly important feature inasmuch as differently sized and shaped resilient materials will yield different types of shoulder pads and other articles shaped by the pad-forming device 10.

As noted above, the piston (not shown), cylinder 19 and the piston rod 20 are provided to effect the up and down movement of the upper platform 14 so that the molding members 15 and shaping members 13 can be moved from an open position to a closed position. The advancing and retracting movement of the piston rod 20 is accomplished pneumatically via main air supply line 30 which provides air from an air source at approximately 50–60 psi. The main air supply line 30 is connected at one end to the air source, snaked through the vertical support member 17 to continuously provide air to solenoid valve 31 and air switch 32. Air conduit 33 is connected to the solenoid valve 31 to provide air to the lower half of the cylinder 19, beneath the piston to which the piston rod 20 is connected, so that air pressure may be exerted against the piston to raise the upper platform 14 and female molding members 15 to the open position of the pad-forming device 10. Air conduit 34 is also connected to the solenoid valve 31 at one end, the other end being connected to the upper portion of the cylinder 19 so as to selectively exert air pressure above the piston to forcibly advance the piston rod 20, thus causing the upper platform 14 and female molding members 15 to descend into the closed position.

The solenoid valve 31 is constructed so that when air is being furnished to the solenoid valve 31, the air will be free to travel through the air conduit 33 to maintain the female molding members 15 and male shaping members 13 in the open position. However, when both switches A and C are depressed, the solenoid valve 31 is electrically activated to simultaneously terminate the air flow to the air conduit 3 and permit air to flow to air conduit 34, thus forcing the piston in the cylinder 19 in a downward direction to advance the piston rod 20 and move male shaping members 13 and female molding members 15 into the closed position. An emergency cut-off switch B is provided between the switches A and C should an emergency occur and the pad-forming device 10 must be quickly moved to the open position. Under normal operation, however, the dwell control 35 is connected to the solenoid valve 31 to terminate the air flowing to the air conduit 34 and again permit air to flow to the air conduit 33 so as to raise the female molding members 15 into the open position. A time dial 35a is provided on the dwell control 35 so that the time in which the pad-forming device 10 is in the closed or dwell position can be adjusted in relation to the particular pad-forming application being employed.

Figure 7:
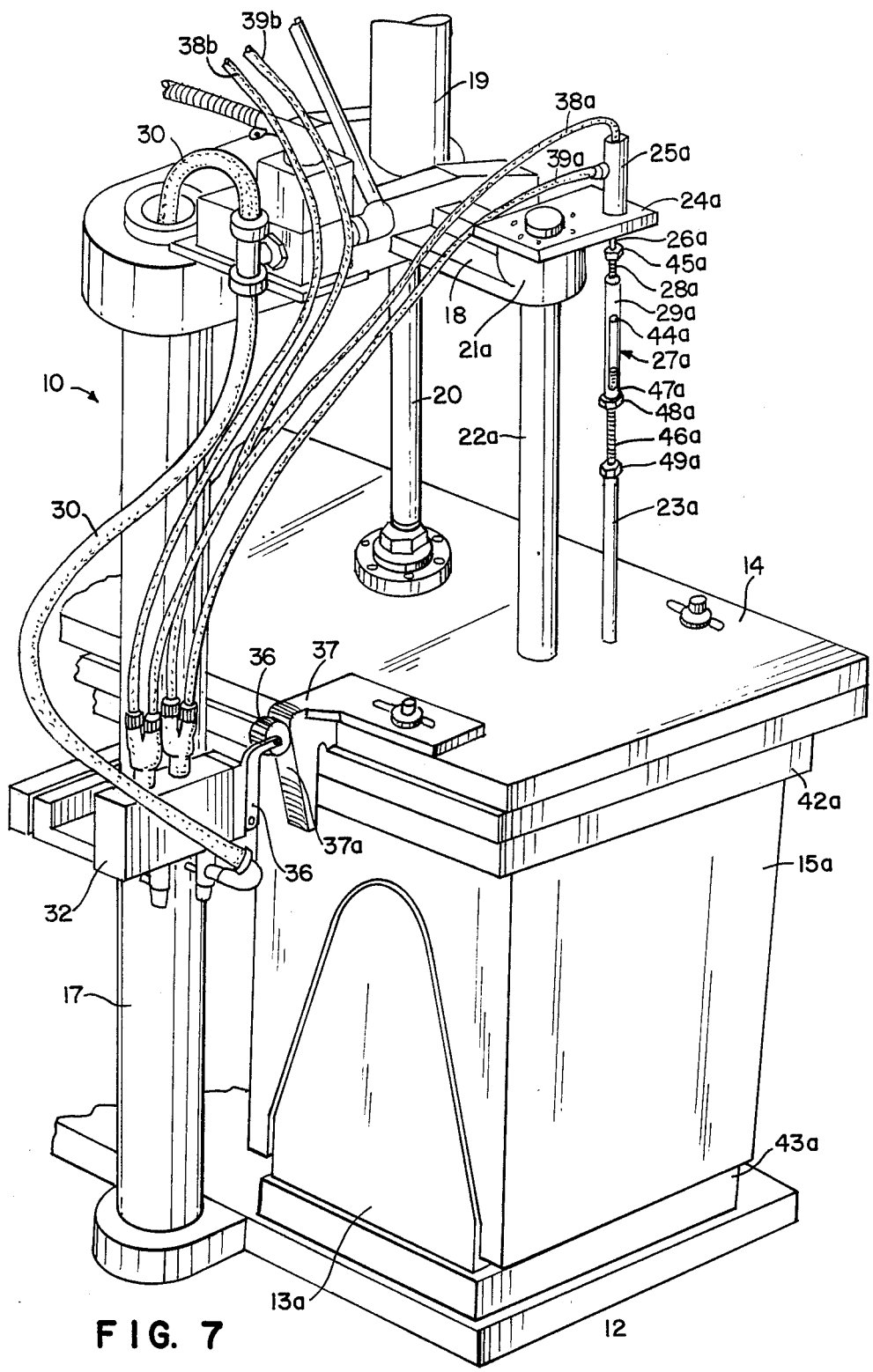
FIG. 7 is a right rear perspective of a portion of the pad-forming device shown in FIG. 6, illustrating in particular the cam-actuated air switch and retractable pins.
Figure 8:
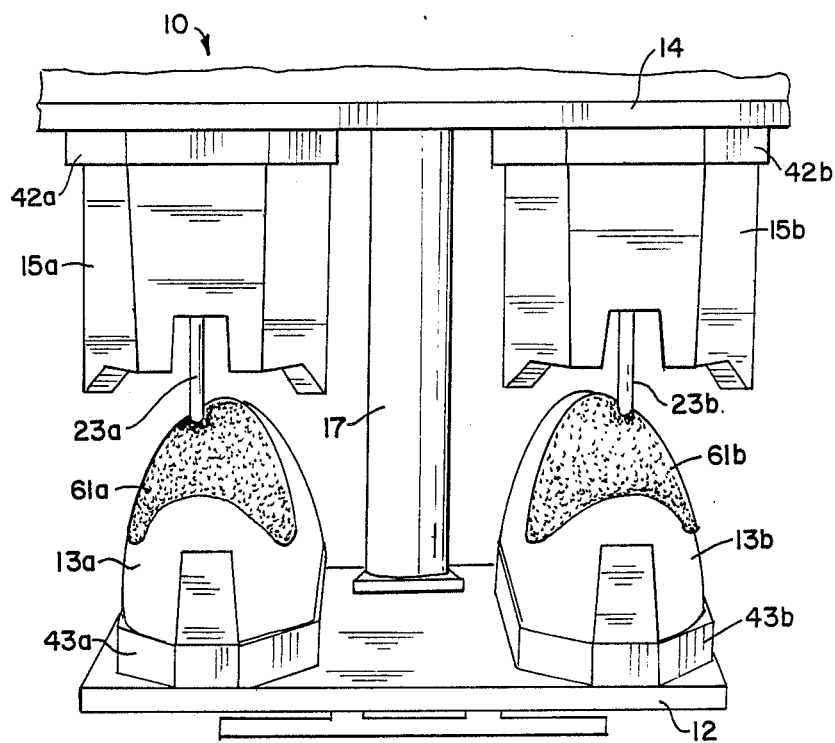
FIG. 8 is a front elevational view of the shaping and molding members of the pad-forming device shown in FIG. 1 in the open position after forming two pads from the two pieces of material shown in FIG. 5.

The air switch 32, to which air continuously flows, is activated by means of a cam switch 36, as shown in FIG. 7, which is connected to the air switch 32. Cam switch 36 includes a roller 36a disposed for rolling contact with cam surface 37a of cam member 37 which is fastened to the rear portion of the upper platform 14. When the pad-forming device 10 is in the open position, the cam switch 36 is normally opened to permit air to flow through air lines 38a and 38b to the mini-cylinders 25a and 25b, respectively. As with the advancement of the piston rod 20, this arrangement exerts air pressure against the top surfaces of the mini-pistons pistons within the mini-cylinders 25a and 25b to forcibly advance the mini-piston rods 26a and 26b, which in turn, advances the hold-down knockout pins 23a and 23b. When the pad-forming device 10 is moved to the closed position, roller 36a contacts cam surface 37a, whereby cam switch 36 is depressed and thereby activated. When activated in this manner, cam switch 36 terminates the air flow to the air lines 38a and 38b and commences air flow to the air lines 39a and 39b so that air pressure is exerted against the bottom surfaces of the mini-pistons in mini-cylinders 25a and 25b thus retracting mini-piston rods 26a and 26b. Of course, the angle of the cam surface 37a, as measured against an imaginary vertical axis, must be calibrated with respect to the closing of the female molding members 15 onto the male shaping members 13 so that the hold-down knockout pins 23a and 23b do not retract prematurely. Such premature retraction could result in the resilient material falling from the male shaping members 13 prior to the closing of the female molding members 15. Once the dwell time is complete and the pad-forming device 10 is open, the roller 36a rolls off cam surface 37a and the cam switch 36 returns to its normally opened position, whereby the air flowing to air lines 39a and 39b will be terminated and air will again commence to flow to air lines 38a and 38b. The hold-down knockout pins 23a and 23b will then, by reason of air pressure being exerted on the mini-pistons, advance to the predetermined distance from the male shaping members 13a and 13b. During the initial moments of advancement following the opening of the pad-forming device 10, the hold-down knockout pins 23a and 23b will serve to eject any resilient material which might adhere to the heated female molding members 15a and 15b, as shown in FIG. 9D and further explained below.

As mentioned above, the male shaping member 13 and female molding members 15 are heated to facilitate the shaping of the resilient material. The heating of these members is accomplished electrically, the heating of the male shaping members 13 being controlled by heat control 40 and the heating of the female molding members 15 being controlled by the heat control 41. FIG. 2 shows electrical boxes 51a and 51b for the female molding members 15a and 15b and electrical boxes 52a and 52b for the male shaping members 13a and 13b, and the electrical conduit carrying electrical conductors from each electrical box to the member to be heated. Thermocouple control switches (not shown) are included within the heat control 40 and the heat control 41 to maintain the heated members at the temperatures indicated on adjustment dials 40a and 40b, respectively. Insulation members 42a and 42b are provided between the respective female molding members 15a and 15b and the upper platform 14, and similarly, insulation members 43a and 43b are provided between the respective male shaping members 13a and 13b and the lower platform 12. These insulation members can be made of any suitable materials, such as maronite or asbestos, to prevent the heat from the heated members from being conducted to the platform members and other elements of the pad-forming device 10.

To prepare the pad-forming device 10 for operation, the air source would be activated to supply air at 50-60 psi to the solenoid valve 31 and air switch 32, thereby raising the female molding members 15a and 15b into the open position. The heat source would then be activated to heat the male shaping members 13 and female molding members 15 to the predetermined temperature dialed on the adjustment dials 40a and 41a. It should be noted that the temperature to which the shaping and molding members are to be raised will vary depending on the type of material being shaped, the shape and thickness of the material being shaped and the firmness required in the pad shaped from the material. For most shoulder pads of the type discussed above, which are made of a heat-formable polyester fiber material, the shaping and molding members should be heated to a temperature of approximately 400° F. The time in which the female molding members 15 will dwell in the closed position should then be adjusted by time dial 35a of the dwell control 35. As with the temperature of the shaping and molding members, the dwell time of the pad-forming device 10 will vary depending upon the type of material being shaped, the shape and thickness of the material being shaped and the firmness required in the pad shaped by the shaping and molding members. The dwell time for a heat-formable polyester fiber material is ordinarily in the order of 8 to 12 seconds.

In operation, an operator will insert two pieces of a heat-formable resilient material, generally designated as 60a and 60b, between the hold-down knock-out pins 23a and 23b and the male shaping members 13a and 13b. Such insertion is easily accomplished by "working" the resilient materials between the hold-down knock-out pins and the male shaping members 13. The resilience of materials such as a polyester fiber material or a foam material facilitates the insertion. As noted above, the free vertical "play" provided in the hold-down knock-out pins 23a and 23b further facilitates such insertion of resilient materials. Once the resilient materials have been inserted to the proper position on the male shaping members, the operator can remove his hands from the vicinity of the shaping and molding members and the hold-down knockout pins will secure the resilient materials in position for shaping, as shown in FIG. 9A.

It is also important to realize that pads and articles of different sizes and shapes can be obtained by the positioning of the resilient materials between the hold-down knockout pins and the male shaping members. For instance, a resilient material which is not inserted very far in the direction transverse to the axis of the hold-down knockout pin will yield a pad or article having a more fully developed cup-shaped shoulder portion, at least with respect to the contour of the shaping and molding members shown in the drawings herein. Of course, the shaping contour of the shaping and molding members can be varied to yield pads or articles of different shapes and sizes.

As a safety feature, the pad-forming device 10 is arranged so that both the switch A and switch C must be depressed to actuate the movement of the female molding members 15 to the closed position. In this manner, an operator will need both hands to effect the closing of the pad-forming device 10, and therefore his hands will not be in the vicinity of the shaping and molding members where they could be crushed. If there should be an emergency, however, emergency cut-off switch B is provided to override the dwell control 35, thus immediately opening the pad-forming device 10 if actuated. Once switches A and C are depressed, the pad-forming device 10 will close and, by virtue of the roller 36a rolling on the cam surface 37a of the cam member 37 which is connected to the upper platform 14, the cam switch 36 will reverse the air flowing into the minicylinders 25a and 25b to retract the hold-down knockout pins 23a and 23b in the openings 60. In the retracted position, the hold-down knockout pins 23a and 23b will not interfere with the molding of the resilient materials 60a and 60b. These steps are shown in FIGS. 9B and 9C.

Once the dwell time controlled by the dwell control 35 is complete, the air to the cylinder 19 will be reversed, as explained above, to raise the piston rod 20 and thereby move the upper platform 14 and the female molding members 15a and 15b to the open position. As the upper platform 14 moves upwardly, the roller 36a of cam switch 36 will roll off cam surface 37a to the normally open position, whereby the air to the mini-cylinders 25a and 25b will be reversed to advance mini-piston rods 26a and 26b, thus advancing hold-down knockout pins 23a and 23b. As hold-down knockout pins 23a and 23b are advanced through the respective opening 50 of the female molding members 15, as shown in FIG. 9D, the hold-down knockout pins 23a and 23b serve to knockout or eject any pads 6 which might stick to the inner surface of the molding cavities 16a and 16b. This eliminates the need for the operator to peel any pads 61 which stick to the molding cavities 16a and 16b before removing the shaped pad 61 from the pad-forming device 10 and preparing the pad-forming device 10 for another cycle. The shaped pads 61 or other articles, shown clearly in FIGS. 8 and 9D, can now be removed from the pad-forming device 10 and the operator can load the pad-forming device 10 for shaping another pair of pads.

The operation of the pad-forming device 10 can be summarized by reference to FIGS. 9A–9D. In FIG. 9A, the heat-formable resilient material 60 is held between the hold-down knockout pin 23 in its advanced position, and the heated male shaping member 13, in its open position. FIG. 9B shows the heated female molding member 15 as it begins to descend onto the male shaping member 13 and the hold-down knockout pin 23 begins to retract. FIG. 9C shows the female molding member 15 and the male shaping member 13 in the closed position, shaping the resilient material 60, and the hold-down knockout pin 23 in its retracted position. Finally, FIG. 9D shows the female molding member 15 as it begins to move to the open position and the hold-down knockout pin 23 advancing to eject the pad 61 from the molding cavity 16 of the female molding member 15.

As indicated above, the various parameters relating to dwell time, temperature and the like can be varied in accordance with the shaping of different articles. It should also be noted that the actuation of the various switches, such as the cam switch 36, must be calibrated so as to operate in the proper sequence and at the appropriate times. Further, the various air lines, switches and elements relating to the hold-down knockout pins can be provided in kit form, so that pad-forming devices without this hold-down knockout feature can be modified to provide a safe and efficient pad-forming device in accordance with the present invention.

While the foregoing description and figures illustrate one preferred embodiment of the pad-forming device in accordance with the present invention, it should be appreciated that certain modifications may be made in the materials used as well as the structural and functional aspects of the disclosed embodiment without departing from the spirit and scope of the present invention which is defined by the claims which are set forth immediately hereafter.

What is claimed is:

1. A pad-forming device for shaping a piece of resilient material, said pad-forming device comprising:
   a. a shaping member;
   b. a molding member vertically oriented with respect to said shaping member, said shaping member and said molding member being movable relative to one another between an open position wherein said members are remote from one another and a closed position wherein said members are juxtaposed with one another;
   c. a hold-down element; and
   d. hold-down engagement means for positioning said hold-down element at an advanced position wherein said hold-down element lies at a distance from said shaping member while said members are in said open position so that the piece of resilient material can be inserted and held between said hold-down element and said shaping member prior to movement of said members to said closed position, said hold-down element having vertical play means for providing a range of free upward vertical movement so that when in said advance position, said hold-down element can be moved upwardly through said range to accommodate pieces of resilient material having different thicknesses.

2. The pad-forming device claimed in claim 1, wherein said vertical play means is adjustable so that said range through which the hold-down element can be moved when in said advanced position can be varied.

3. The pad-forming device claimed in claim 2, wherein said hold-down element includes hold-down adjustment means so that the distance between said hold-down element and said shaping member can be varied.

4. The pad-forming device claimed in claim 3, wherein said hold-down engagement means is adapted to move said hold-down element from said advanced position to a shaping position when said members are moved to said closed position so that said hold-down element will not interfere with the shaping of the piece of resilient material.

5. The pad-forming device claimed in claim 4, wherein said hold-down engagement means is adapted to move said hold-down element to an eject position when said members are moved from said closed position to said open position so as to eject a shaped piece of resilient material.

6. The pad-forming device claimed in claim 1, wherein said hold-down engagement means is adapted to move said hold-down element from said advanced position to a shaping position when said members are moved to said closed position so that said hold-down element will not interfere with the shaping of the piece of resilient material.

7. The pad-forming device claimed in claim 1, wherein said hold-down engagement means is adapted to move said hold-down element to an eject position when said members are moved from said closed position to said open position so as to eject a shaped piece of resilient material.

8. A pad-forming device for shaping a piece of resilient material, said pad-forming device comprising:
   a. a shaping member, said shaping member being shaped about its sides and top;

b. a molding member having a shaped cavity adapted to matingly receive the shaped top and at least a portion of the shaped sides of said shaping member, said molding member including a hold-down opening communicating with said shaped cavity, said shaping member and said molding member being movable relative to one another between an open position wherein said members are remote from one another and a closed position wherein said members are juxtaposed with one another;

c. a hold-down element disposed for movement in said hold-down opening; and d. hold-down engagement means for positioning said hold-down element at an advanced position wherein said hold-down element lies at a distance from said shaping member while said members are in said open position so that the piece of resilient material can be inserted and held between said hold-down element and said shaping member prior to movement of said members to said close position, said hold-down element having vertical play means for providing a range of free upward vertical movement so that when in said advanced position said hold-down element can be moved upwardly through said range to accommodate pieces of resilient material having different thicknesses.

9. The pad-forming device claimed in claim 8, wherein said vertical play means is adjustable so that said range through which the hold-down element can be moved when in said advanced position can be varied.

10. The pad-forming device claimed in claim 9, wherein said hold-down element includes adjustment means so that the distance to which the hold-down element can be moved when in said advanced position can be varied.

11. The pad-forming device claimed in claim 10, wherein said hold-down engagement means is adapted to move said hold-down element from said advanced position to a shaping position when said members are moved to said closed position so that said hold-down element will not interfere with the shaping of the piece of resilient material.

12. The pad-forming device claimed in claim 11, wherein said hold-down engagement means is adapted to move said hold-down element to an eject position when said members are moved from said closed position to said open position so as to eject a shaped piece of resilient material.

13. A pad-forming device for shaping a piece of resilient material, said pad-forming device comprising:

a. a shaping member in a stationary upright position, said shaping member being shaped about its sides and top;

b. a molding member movably positioned above said shaping member, said molding member having a shaped cavity adapted to matingly receive the shaped top and at least a portion of the shaped sides of said shaping member, said molding member including a hold-down opening communicating with said shaped cavity, said molding member being movable relative to said shaping member between an open position wherein said members are remote from one another and a closed position wherein said members are juxtaposed with one another;

c. a hold-down element movably disposed in said hold-down opening; and d. hold-down engagement means for positioning said hold-down element at an advanced position wherein said hold-down element lies at a distance from said shaping member while said members are in said open position so that the piece of resilient material can be inserted and held between said hold-down element and said shaping member prior to movement of said members to said closed position, said hold-down element having vertical play means for providing a range of free upward vertical movement so that when in said advanced position said hold-down element can be moved upwardly through said range to accommodate pieces of resilient material having different thicknesses.

14. The pad-forming device claimed in claim 13, wherein said hold-down engagement means is adapted to move said hold-down element from said advanced position to a shaping position when said members are moved to said closed position so that said hold-down element will not interfere with the shaping of the piece of resilient material.

15. The pad-forming device claimed in claim 13, wherein said hold-down engagement means is adapted to move said hold-down element to an eject position when said members are moved from said closed position to said open position so as to eject a shaped piece of resilient material.

16. The pad-forming device claimed in claim 13, wherein said vertical play means is adjustable so that said range through which the hold-down element can be moved when in said advanced position can be varied.

* * * * *

UNITED STATES PATENT AND TRADEMARK OFFICE
CERTIFICATE OF CORRECTION

PATENT NO. : 4,959,004
DATED : September 25, 1990
INVENTOR(S) : Nowakowski

It is certified that error appears in the above-identified patent and that said Letters Patent is hereby corrected as shown below:

Column 6, line 45, "conduit 3" should read --conduit 33--.

Column 7, line 5, delete "pistons" (second occurrence).

Column 9, line 23, "pads 6" should read --pads 61--.

Signed and Sealed this

Twenty-first Day of January, 1992

Attest:

HARRY F. MANBECK, JR.

*Attesting Officer*      *Commissioner of Patents and Trademarks*